United States Patent [19]

Cox, Sr.

[11] Patent Number: 5,658,961
[45] Date of Patent: Aug. 19, 1997

[54] MICROBIOLOGICAL FIRE-FIGHTING FORMULATION

[76] Inventor: Charles S. Cox, Sr., 14711 Berry Knoll, Apt. 39, Houston, Tex. 77079

[21] Appl. No.: 372,758

[22] Filed: Jan. 13, 1995

Related U.S. Application Data

[63] Continuation-in-part of Ser. No. 285,935, Aug. 4, 1994, abandoned.

[51] Int. Cl.$^6$ .................................................. C08J 9/28
[52] U.S. Cl. .............................. 521/65; 252/2; 252/3; 424/93.4; 521/84.1
[58] Field of Search .............................. 424/93.4; 252/2, 252/3; 521/65, 84.1

[56] References Cited

U.S. PATENT DOCUMENTS

| | | |
|---|---|---|
| 4,288,545 | 9/1981 | Spraker. |
| 4,482,632 | 11/1984 | Spraker. |
| 4,810,385 | 3/1989 | Hater et al. ............................ 435/292 |
| 5,133,991 | 7/1992 | Norman et al.. |
| 5,225,095 | 7/1993 | DiMaio. |

*Primary Examiner*—James J. Seidleck
*Assistant Examiner*—John M. Cooney, Jr.
*Attorney, Agent, or Firm*—Sherman D. Pernia

[57] ABSTRACT

An improved microbiological fire-fighting foam which comprises a bioremediating component, surfactants, foaming agents, and inorganic nutrients, the bioremediating component consisting substantially of sporulating bacteria which are tolerant of the surfactants used, the surfactants selected being innocuous to the bioremediating component used both when the microbes are in a spore state and when activated, and the selected surfactants further being biodegradable by the microbes of the microbial solution. Alternative embodiments of the invention include formulations which comprise perfumes and/or preservatives in addition to the constituents mentioned above. The improved formulation enables microbiological digestion to inert volatile organic compounds and hydrocarbons which may indeed be ablaze when applied.

22 Claims, No Drawings

MICROBIOLOGICAL FIRE-FIGHTING FORMULATION

This is a Continuation-in-part application of a patent application entitled "MICROBIOLOGICAL FIRE-FIGHTING FOAM CONCENTRATE", Ser. No. 08/285,935 filed Aug. 4, 1994, which is now abandoned, the contents of which are incorporated by reference.

TECHNICAL FIELD

The present invention relates to a formulation for both extinguishing fires and for decomposing (bioremediating) difficult waste organic materials, including hydrocarbons, responsible for the fire; more specifically it relates to single product useful for controlling and extinguishing organic fires and for cleaning the residual hydrocarbon waste spills with a component which biodegrades the residual spill product in situ, thereby reducing the need for expensive waste handling and disposal methods which usually involve the removal and disposal of the contaminated soil material.

SUMMARY

The present invention is a formulation of an aqueous mixture of preselected microorganisms, inorganic nutrients, a stabilizer, an optional preservative, foaming agents and surfactants useful for extinguishing fires and bioremediating a fire site. Microorganisms in this mixture are stabilized until used and then activated when applied to waste organic compounds including hydrocarbons. The selection of specific activatable microbes, microbe cultures, microorganisms, bacteria, spores, or sporogenous microbe strains will vary depending on the waste material to be remediated, but is well within the ability of one of ordinary skill in the art. The presence of the inorganic nutrients solution within the bioremediating component promotes an increase in the growth and reproductive capacity of the microbes while feeding on the material being decomposed. The result of increased microbe growth and reproductive capacity is a greatly increased microbe population available to decompose waste organic compounds including hydrocarbons soon after application, and the sustaining of this microbial activity.

In broad practice, this invention comprises a bioremediating component including inorganic nutrients, and a fire-extinguishing component including a foaming agent. The inorganic nutrients in the inorganic nutrients solution support the reproduction and growth of the microbe strains of the bioremediating component. They support the growth and reproduction of these strains when they are activated in the presence of waste organic compounds and water. The mixture contains from about 40% to about 50% by volume of an aqueous inorganic nutrients solution, from about 30% to about 40% by volume foaming agent and from about 16% to about 20% by volume of pre-mixed microbe-surfactant solution. The preferred embodiment of this invention contains about 45% by volume of the inorganic nutrients solution, about 36.7% by volume foaming agent (e.g. ammonium lauryl sulfate), and about 18.3% by volume of the pre-mixed microbe-surfactant solution. The pre-mixed microbe-surfactant solution itself contains surfactants to disperse and extinguish the fire and facilitate the decomposition of the volatile organic compounds by the microbe cultures, a stabilizer, a preservative, an optional perfume or deodorant with the microorganism culture ("microbes").

BACKGROUND

Foaming concentrates have been known and used since before 1940 for use as fire fighting agents, for crop protection and for a variety of other applications. Ingredients are added for a variety of reasons, for example: microbicides are often added to discourage bacterial decay of the foam, preservatives are added to impart shelf life stability, other ingredients are sometimes added to lower the freezing point, and/or to alter the viscosity.

For many applications it is desirable to produce a foam which is persistent for several days. Examples of such applications are as temporary covers for landfills and waste piles, covers for spills of hazardous materials and crop protection against frost. Because of this, a bactericide is usually added as a preservative to prevent the decomposition of the foam concentrate by bacteria. Protein hydrolysates are a constituent found in foam of a prior art formulation, as described in U.S. Pat. No. 5,225,095 to DiMaio, and also U.S. Pat. No. 5,133,991 to Norman et al. Because these hydrolysates are excellent nutrient sources for microbiological life forms, a low level toxicity biocide is usually recommended as an additive to preserve the concentrate. The fact that most foams are susceptible to microbial decomposition provides a basis for the conclusion that the art of fire-fighting foams teaches against the inclusion of microbial life forms in their formulations.

Organics-decomposing-microorganisms have been commercially available to clean oil spills from oil tankers and to assist in waste removal from grease interceptors in restaurants for some time now. Microbes specifically engineered for the decomposition of difficult organic compounds are well known and readily available. For example, Sybron Chemicals, Inc. manufactures the microbiological strains utilized in one embodiment of the present invention under U.S. Pat. Nos. 4,482,632 and 4,288,545, incorporated herein by reference. The microbiological strains of the Bacillus species particularly effective in the practice of the invention in connection with the consumption of volatile organic compounds are *B. subtilis, B. licheniformis,* and *B. polymyxa.*

In addition, the selection of one of the above strains is advantageous because these species of Bacillus are not true pathogens as are the species *B. anthracis* and *B. cereus.* Reports of infections in man caused by Bacillus species other than *B. anthracis* and *B. cereus* are rare. According to a report by the Department of Biology of the Virginia Polytechnic Institute and State University, *B. subtilis, B. licheniformis,* and *B. polymyxa* as described by the manufacturer, Sybron, would not constitute a public health hazard unless the microorganisms were used in an area where individuals with an unusual vulnerability (such as when undergoing an open-incision surgical procedure) would be exposed.

Investigation of microbial degradation of oil dates back to at least 1942, when the American Petroleum Institute began to subsidize research in the field. Considerable basic knowledge about factors that affect natural biodegradation, about the kinds of hydrocarbons capable of being degraded, and about the species and distribution of the microorganisms involved in biodegradation had already been developed in the early 1970s. For instance, the Office of Naval Research sponsored more than a dozen basic and applied research projects in the late 1960s and early 1970s on oil biodegradation to control marine oil spills. Since this time, a large number of refineries, tank farms, and transfer stations now employ in situ bioremediation to restore land contaminated by accidental spills of fuel oil or other hydrocarbons.

Probably the most important series of field tests of the use of fire-fighting foam to control organics and hydrocarbon fires were conducted in the aftermath of the Persian Gulf War. The oil field fires created an environment of urgency and necessity which focused creative minds on solving the problems at hand, and on concentrating on research and development to solve the problems which were anticipated to occur again in the future.

Aqueous Film Forming Foam ("AFFF", a product of Minnesota Mining and Manufacturing) is the most commonly used fire-fighting foam currently on the market. Despite this fact, it was rarely used during the oil field fires of Kuwait because of its relative ineffectiveness in extinguishing fires of such a magnitude and intensity (unless the source is completely blanketed with foam) and because of its relative inability to prevent flashbacks. In addition, "AFFF" contains fluorinated surfactants and butyl-ether, both generally considered to be toxic substances. It has been observed that some soils contaminated with "AFFF" several years earlier still foam up during a rain for example. This is evidence of the persistence of the fluorosurfactant used and its resistance to biodegradation. This may present a hazard to fish and other forms of wildlife in shallow waters that breath through their pores, at least until the surfactant used in "AFFF" is sufficiently diluted or is naturally biodegraded. Being well aware of these negative side effects to "AFFF's" use, the United States Defense Department has been seeking a non-toxic yet effective alternative to "AFFF." The present invention is just such an alternative.

Microorganisms ("microbes") of the type used in the present invention are capable of assimilating and breaking down the non-soluble organic materials including hydrocarbons that compose grease and oil into relatively harmless substances of water-soluble products, carbon dioxide and a lesser quantity of fatty acids. These types of microorganisms are relatively commonplace in the environment.

The difficulty encountered in incorporating microbe cultures in a fire-fighting foam solution which will extinguish organically fueled fires and begin the disposition of the residual hydrocarbon waste products were many. The first challenge was the selection of a hardy strain of organics-consuming (primarily hydrocarbon-consuming) microorganisms which withstand the extremely severe environment associated with organically fueled fires in a proportion sufficient to adequately address the magnitude of the overall bioremediation challenge presented. A second challenge was determining the specific organism that digest or decompose a particular grease or oil and yet remain capable of being stabilized so that they have a satisfactory shelf life thereby being available when needed. A third challenge was the selection of a microbial strain which would stabilize in a surfactant strong enough to extinguish the fire. A fourth challenge was to control the microbe population so that they multiply and exist in sufficient quantities so as to accomplish the job of hydrocarbon waste removal in a timely fashion.

A need therefore exists for a bioremediating fire-fighting foam mixture and a method for the decomposition of organic materials which meets the challenges presented in order to reduce cleanup costs and increase the quality of the cleanup by providing an effective and environmentally safe means to do so.

BRIEF DESCRIPTION OF THE INVENTION

The present invention is a formulation which will not only put out the fire, but go after what caused the fire through microbial decomposition of the most volatile organic wastes, particularly those of hydrocarbon fires. The end product of this decomposition is carbon dioxide, non-toxic water soluble products, and new microbial biomass. The present invention is undergoing extensive testing at Tyndall Air Force base, Panama City, Fla. and at the Brayton Fire Field at Texas A&M University.

The motivation for developing a formulation which included microbes for extinguishing fires was founded on an appreciation for the severe environmental impact the oil field fires and spills were having on the soil in Kuwait in the aftermath of the Persian Gulf War. The inventor sought to determine whether a particularly hardy strain of bacteria would be able to withstand the heat of a fire site immediately after extinction of a hydrocarbon fire for the purpose of determining how soon after the conventional extinction of the flame a bioremediating solution could be applied and still survive in sufficient numbers to perform their function. Because of the time for emergency response where fire-fighting equipment is readily available is typically a short period, and because the procedure for testing the effectiveness of fire-fighting foams involves application after only thirty (30) seconds from ignition, the temperatures which microbes would be subjected to are quite low—there was little or no concern that the microbe population would be severely curtailed when subjected to this relatively low level of heat. Later tests confirmed this belief—when subjected to "30 second" blaze tests, microbe survivability after extinction of the flames was as high as 66 percent. However, in Kuwait, where fires raged for several days before extinction, temperatures of the fire site immediately after the extinction of the flames were substantially higher, as high as 1800 degrees Fahrenheit in some instances. In addition, the ordinary ground temperatures in Kuwait average about 120 degrees Fahrenheit.

Recognizing the duty to help remediate the ecological catastrophe in progress in Kuwait, and the unique opportunity to conduct experiments in the severest of all earthly environments, trials using a spill-control formulation comparable to that of the present invention were commenced with rather surprising results. Not only did approximately thirty three (33) percent of the microbes of the formulation survive the intense heat, but the formulation extinguished the fire within a period of time which indicated that the formulation might be effective as a fire-fighting agent, despite the fact that no foaming agents were present in the formulation at this time. Again, this was an unexpected result—the goal of the application was merely to determine how soon the bioremediating agents could be applied to begin to decompose the organic compounds. Early analysis of the constituents of the formulation showed that the manufacturer of a proprietary constituent had permitted some residual alcohol to remain in the formulation. Alcohol of course is a combustible and its presence was not beneficial to the goal of extinguishing the flames. The alcohol was subsequently removed from the proprietary constituent with the result being improved fire-fighting characteristics of the formulation. It was also observed that the heat of the fire site shortly after the extinction of the blaze caused the sporogenous microbes to come out of spore and begin the work of decomposing the waste in a foreshortened period of time.

It should be emphasized that the microbes in the formulation do not help extinguish the fire—the surfactant of the formulation actually extinguishes the flames and cools the surface of the organic waste (oil, the crude and the sludge) sufficiently to permit one-third of the bacteria applied to survive. Ordinary procedure in extinguishing fires is to overspray and to continue to apply the foam for at least one minute after the flames are extinguished. It is at this point that most of the surviving microbes are injected into the hazard. The surfactants in the formulation break down the volatiles, thereby preventing flashback or re-ignition. It does this in part by dispersing the volatile materials through the reduction of its surface tension and subsequent encapsulation of each dispersed droplet of the organic compounds by surfactant molecules. In addition, in the period of time beginning immediately upon application and extinction of the flames, it is the surfactant and not microbial decomposition which prevents the flash-back through a mechanism which breaks down the compounds, changing the molecular structure of some of the most volatile compounds such that the flash point is greatly reduced. The microbes of the present invention then take over, going to the source of the problem—namely the volatile hydrocarbon or organic compounds which cause the fire. After extinction of the flames, the presence of the surfactant continues to have a synergistic effect by aiding in the biodegradation process by cleaning away and dispersing the oil particles so that more surface area is exposed to organics-consuming microbes, thereby speeding the process of decomposition. The volatiles are then broken down even further through microbial decomposition such that they no longer constitute an immediate threat of re-ignition.

The use of the formulation of the present invention also reduces cost as it is no longer necessary to mechanically remove contaminated soil after the fire is extinguished—the formulation continues to remediate the products of the spill as long as the area is sufficiently moist, breaking the organic material down into carbon dioxide, water-soluble products and new biomass.

A key to this invention was the selection of sporogenous microbe strains mentioned above which (1) stabilizes in a surfactant of sufficient strength to extinguish the flames and (2) survives the intense heat associated with such a fire site after extinction of the flames such that a significant population of the microbes are present and activated to begin the decomposition of the volatiles.

The primary goal of the present invention is not to cover (blanket) the combusting organics (as is common with traditional fire-fighting foams) but rather to penetrate them. Foam is desirable as a medium to help get through the heat due to its insulating characteristics, thereby protecting the bacteria, and as a medium to transport the surfactant and the microbes to the source of the fire. The foam acts as an effective carrier for the microbes and the surfactant solution such that when it covers an area, the surfactant contained therein is able to drop out of the foam directly onto the combusting surface of the organic compounds, thereby extinguishing the flames. Subsequent to the extinction of the flames, the activated microbes drop out of the foam and onto the volatiles immediately commencing the decomposition process—the microbes come out of spore and begin to attack the source of the fire, converting it into carbon dioxide, water-soluble products and microbial biomass.

Because of the beneficial effects of foam cited above, ammonium lauryl sulfate ("ALS") is added as a constituent to aid in the formation of foam. It should be understood that it will be readily apparent to those of ordinary skill in the art to use substitute foaming agents, in place of or in addition to ALS. However, ALS has been chosen for its effectiveness as well as its non-toxicity as is evident from its prevalent use in personal hygiene products such as shampoos. Environmental friendliness is one of the most important considerations of the present invention—its formulation has been determined such that substantially all of the constituents of this product will biodegrade in about thirty (30) days time, including surfactants and foaming agents.

DETAILED DESCRIPTION OF THE INVENTION

Harnessing the power of microbes is hampered by the lack of control over growth and reproductive rates. The present invention comprises a mixture of a stabilized bioremediating component, a foaming agent and an inorganic nutrients solution and its use for fire-fighting and spill remediation purposes. The presence of the inorganic nutrients causes rapid growth and reproduction of the microbes when contacting waste petroleum products.

According to a first object of this invention there is provided a process for extinguishing an organically fueled fire and for treating waste organic spill product by applying a combination fire extinguishing and a bioremediating formulation comprising microbes, foaming agents, stabilizers, nonionic surfactants and inorganic nutrients to the substrate. In a first formulation, a mixture of inorganic nutrients, foaming agent and (commercially available) pre-mixed microbe-surfactant solution is prepared through a process comprising mixing one part microbiological fire-fighting formulation with about 10 to about 100 parts of ordinary tap water. The process further comprises applying this mixture in sufficient quantity to cover the combusting area using for example, a fire truck pumper with a 1.5 inch hose at 90 to 125 psi and an eductor. After the extinction of the flames and inerting the volatiles, the fire site may be cleaned by rinsing down the substrate with ordinary tap water so that the waste water and decomposing hydrocarbon biomass drains away. The presence of surfactant provides the primary fire-extinguishing agent and its selection is such that it is innocuous to the microbes used. The surfactant used is later consumed by the microbe cultures which are a constituent of the invention's formulation.

According to a second object of the invention, there is provided a process for treating soil contaminated by waste organic material such as grease, petroleum or petroleum products which is left behind after an organically fueled fire has been extinguished.

A third object of the present invention, that of providing an effective, safe and inexpensive means of dealing with fuel or oil fires on public highways, is explained best by way of the following hypothetical example:

An "18 wheeler" tanker spills fuel on the highway which immediately ignites, and the anticipated time for emergency response is one hour. Adding to this misfortune, the driver has inadvertently collided with another vehicle in the course of the accident. This second vehicle comes to rest near the flames. Persons are trapped inside. This is a very hazardous situation—without prior planning, there would be few options other than to remain still until the fire department emergency response personnel and equipment arrive. In addition, even if the flames are somehow extinguished, the possibility remains that until the volatiles are inerted the fuel may re-ignite into flames under little more than the weight of a person's foot.

Fortunately, the driver is coherent and is prepared for this eventuality having purchased a 2.5 gallon fire extinguisher loaded with "MICRO-BLAZE OUT" fire-fighting foam (the trade name of a formulation of the present invention). He sprays down the contaminated areas—up to 100 square feet with 2.5 gallons almost immediately extinguishing the flames and simultaneously beginning the process of inerting the volatile contaminants.

If the spill in the above hypothetical is comprised primarily of diesel, it will be inerted almost immediately upon contact; if of gasoline, the process takes considerably more time—about 5 to 20 minutes depending on the concentration of gasoline. In either case, this is substantially less time than one hour, the time required in this hypothetical for a fire truck to arrive. Once the flames are extinguished and the volatiles are inerted, the driver would then be able to help those trapped in the car and to set up his road blocks, etc.

Again in the above hypothetical, when the emergency response unit arrives, the response personnel need only wash the area off, displacing the active mixture of contaminates and "MICRO-BLAZE OUT" fire-fighting foam to the side of the road. The treated area of the highway becomes non-skid, because of the cleaning action of the microbe-surfactant mix. The emergency response team can then move that truck off the highway and allow traffic to flow. The material washed to the side of the road may then be left to digest the residual surfactants and any remaining contaminants. Of course, it will likely dry up before it completely remediates the spill. However, the selection of the bacteria is such that about 80% of the microbes will survive and go back into spore, remaining idle in this resting state. When the ground is moistened once again (e.g. it rains) and the food source is still present, the microbes will come out of spore and continue to bioremediate the spill until the food source (the spill product) is completely digested or until the area dries out again. If the area is kept wet, the microbes would likely consume a large percentage of the remaining organic compounds in the next two week period. This will vary of course, depending on the size and type of the contaminant.

The microbiological strains mentioned above are selected because of their hardiness in that they will stabilize in a surfactant which is capable of extinguishing a typical organically fueled fire, the fact that they are sporogenous, and have an ability to decompose both the surfactant used and a particular type of waste found in the typical hydrocarbon spill. The concentrated mixture contains about 50 to 60 billion microbes per quart. The proportion of each microbiological strain in the bioremediating component may be varied according to the composition of organic materials to which the solution is applied. As the microbes of a particular microbiological strain attack and decompose a component of the spill, those microbes grow and reproduce. If a particular component is not present in the spill, the microbiological strain that feeds on that component will die out.

In one embodiment of the present invention a pre-mixed microbe-surfactant solution is formed when a surfactant and optionally according to need, a stabilizer, a preservative and a perfume are added to the microbial strains to assist in the decomposition of organic matter and cleanup of hydrocarbon waste. As used herein, the term "pre-mixed microbe-surfactant solution" refers to commercially available aqueous microorganism culture concentrates, the component's form prior to mixing with the foaming agent and inorganic nutrients solution. The concentrations of constituents in the present invention are derived from a most preferred embodiment which is formulated using BI-CHEM GC600L 6X (Sybron, Inc., Salem, Va.) as the source for microbes, surfactant, stabilizer, and preservative.

The pre-mixed microbe-surfactant solution of this invention includes about 54% to about 66% aqueous bacteria culture, up to about 1.7% stabilizer, from about 17% to 21% surfactant, and up to about 2% preservative, the balance being water. The microbial strains present in the aqueous bacteria culture were selected because they are capable of decomposing the organic matter found in grease and waste petroleum products. The stabilizer is usually present to maintain the microbe population substantially constant until the microbe solution is brought into contact with waste organic compounds which act as food for the microorganisms. The preservatives prevent destruction of the bacteria culture by toxic organisms. The surfactant acts as the primary fire-extinguishing agent, the initial inerting agent, as a dispersant, and as a cleaning agent and is an important ingredient of this invention. Because of the requirement that it coexist with sporogenous bacteria in either a spore state or in an active state, the surfactant must be innocuous to the organics-consuming bacteria cultures used. The surfactants specifically identified in this specification are all substantially innocuous to the microbes selected.

A surfactant by definition is a substance which alters the surface tension of water, and there are traditionally three types: nonionic, anionic, and cationic. A fourth type which under certain conditions may be anionic or cationic is known as amphoteric. It is the nature of a surfactant molecule to have one end which is hydrophilic and the other hydrophobic. While those skilled in the art may determine specific examples of various surfactants useful in any of the above classes, the preferred class of surfactants for the practice of this invention is the nonionic surfactant, or a mixture thereof, because it has been found to be an effective fire-extinguishing agent, to be innocuous to the organics-consuming bacteria used in the formulation of this invention, and because it is also consumed by the organics-consuming microbes over a reasonable period of time.

Specific examples of nonionic surfactants are compounds which are formed by reacting alkylphenols, particularly octyl- or nonylphenols, with ethylene oxide. Those in common use include Triton series (Union Carbide Corporation), the Igepal series (Phone-Poulenc Corporation), the DeSonic series (Witco Corporation), the Hyonic series (Henkel Corporation), all those of the chemical class ethoxylated alkyl phenol, the Glucopon series (Henkel Corporation) and all those of the chemical class polysaccharide ether. Specific examples include DeSonic 4N, Triton X-100, Igepal Co-630, Igepal Co-730, Hyonic NP-90, Glucopon 225, Glucopon 425 and Glucopon 625. The average number of ethylene oxide molecules attached to each molecule of alkylphenol is between 1 and 12 per molecule of octyl- or nonylphenol. When the ethylene oxide molecules are between 1 and 4, the surfactant is immiscible in water, whereas if the average number of ethylene oxide molecules attached is between 4 and 6, the surfactant is dispersible in water, and 7 or above, soluble. The preferred nonionic surfactant of those above are those soluble in water—these surfactants have an average of from 8 to 12 molecules ethylene oxide per molecule of alkylphenol. This includes a surfactant which is an alkylphenol and ethlyene oxide derived molecule having at least 7 to about 15 ethylene oxide moieties per alkylphenol moiety. Other nonionic surfactants may include ethylene oxide adducts of fatty acids, amines or other substances and their derivatives with ethylene oxide.

Examples of cationic surfactants which may be considered for use in this invention are those liquids formed from the quaternary ammonium chloride derivatives of polypropoxy tertiary amines. A specific example of anionic surfactant which may be useful is octylphenoxypolyethoxyethylphosphate (a phosphated ethylene oxide adduct of octylphenol), a material sold by Rohm and Haas Company (Philadelphia, Pa.) under the trademark "TRITON QS-44". This anionic surfactant may be in a free acid form or as an alkali metal salt, preferably the sodium salt. The active ingredient in other anionic surfactants which may be tested for use in the present invention is sodium dioctylsulfosuccinate. While specific suitable and suggested possible nonionic, cationic and anionic surfactants have been set forth, the surfactants which may be used in the present invention are not limited to those specifically discussed. The foregoing illustrate that water soluble surfactants which are effective at a substantially neutral pH (from about 5 to about 9) are preferred according to the present invention. The selection of the pH is important to avoid an environment damaging to the maintenance of the viability of the microbes. The preferred pH range for the formulation is about neutral, i.e. from about 6 to about 8. However, the concentrate will function when pH is adjusted within a range of about 4 to 11.5.

Stabilizers and preservatives added to maintain the microbe population until applied to waste organic compounds are routinely selected by suppliers of microbes and are not themselves part of this invention. The selection is within the ability of those of ordinary skill in the art.

The most preferred embodiment of the formulation uses premixed microbe-surfactant solution GC 600L 6X, (described below), which is understood to comprise about 60% by volume aqueous bacteria culture, up to about 1.5% by volume stabilizer, about 19% by volume surfactant, and up to about 2% by volume preservative. The aqueous bacteria culture (bacteria spores in water) comprises $B.$ $subtilis$, $B.$ $licheniformis$, and $B.$ $polymyxa$. A suitable aqueous bacteria culture is supplied by Sybron, Inc. (Salem, N.J.) and is sold under the trade name BI-CHEM Spore Concentrate (P). It contains between $12 \times 10^7$ and $14.2 \times 10^7$ CFU/ml ("CFU" is colony forming units). The stabilizer is sodium hydroxide or opacifier (e.g. WITOOPAQUE R-11 from Emulsion Systems); the preservative is a mixture of 1,2-benzisothiazolin and dipropylene glycol; and the nonionic surfactant may be an EO adduct of an alkylphenol such as "TRITON X-100" (supplied by Rohn & Haas) or "NP-9" and "NP-13" (supplied by Emery). Perfume may optionally be added as a deodorizer to improve smell.

The growth and reproductive activity of the microbes is greatly enhanced by the presence of inorganic nutrients. The resulting increase in the quantity of microbes increases the decomposition rate of the organic compounds thereby neutralizing the threat of re-ignition. The presence of inorganic nutrients, stabilizers and preservatives enhances the storage life of the invention. An indefinite shelf life has been achieved in the concentrated mixture.

The preferred inorganic nutrients solution useful in the practice of the invention is made by dissolving water soluble sources of soluble nitrogen, phosphorus and potassium mixing from about 0.1% to 0.3% by weight of commercial fertilizer (e.g. 15-30-15 grade "SCOTT BRAND") with water and allowing the mixture to stand until clear, about 21 days and six hours for this particular fertilizer. It is estimated that the resulting inorganic nutrient solution contains about 0.02% by weight and about 0.06% by weight nitrogen, between about 0.05% by weight and 0.09% by weight phosphorus, between about 0.02% by weight and about 0.06% by weight potassium with the rest being water and soluble filler material.

Although commercial fertilizer is the preferred source of ingredients used in the preparation of the inorganic nutrients solution, natural sources of nitrogen such as found in animal droppings or manure may also be used. Some alternative sources of nitrogen, phosphorus and potassium include the various water soluble salts of these components. The presence of iron may also have a beneficial effect.

A preferred inorganic nutrients solution is made by mixing about 20 pounds of a readily available commercially prepared fertilizer (15-30-15 Scott's delayed action lawn fertilizer) and about 8,330 pounds of water. The fertilizer is allowed to stand in the water for about 21 days and about 6 hours until dissolved. In the preferred embodiment of this invention the fertilizer is placed in a screen holder and lowered into an opening at the top of a 1,000 gallon tank. Tap water is run over the fertilizer until the 1,000 gallon tank is filled. The fertilizer is allowed to stand in the water between 10 to 28 days. In the most preferred embodiment of this invention the fertilizer is allowed to stand in the water for about 21 days and 6 hours until dissolved. Although longer or shorter periods of digestion may be satisfactory it has been found that the solution which has been allowed to stand for 21 days and 6 hours provided the most optimum stimulation to active growth and reproduction of microbes as observed under microscopes. The inorganic nutrients solution made by this process comprises from about 0.1% to 0.3% by weight of a solution of nitrogen, phosphorus and potassium in water.

A preferred formulation of the present invention which is particularly formulated for forest and/or brush fires and commercial or residential building fires, comprises approximately 55 parts GC600L 6X (the composition of which is described above), 110 parts ammonium lauryl sulfate and 135 parts water or, preferably, an aqueous solution comprising nutrients such as nitrogen, phosphorous, and/or potassium. The concentrate thus formed remains stable in storage indefinitely and, when premixed with 97 to 99 parts of water (a 1% to 3% soln), produces an effective fire-fighting agent which may be sprayed directly on the fire using for example, a 1.5 inch hose at 90 to 120 psi. Alternatively, the formulation may be applied using an eductor, a mechanism used to pull the concentrate material into the water stream from a concentrate container. The formulation has been observed to extinguish the flames on contact without substantial danger of flash-back.

A preferred formulation for the present invention which is particularly formulated for crude oil fires, comprises approximately 55 parts GC600L 6X, 110 parts ammonium lauryl sulfate and 135 parts of an aqueous solution comprising inorganic nutrients such as nitrogen, phosphorous, and potassium. The concentrate thus formed remains stable in storage for at least 12 months and, when diluted with 94 to 97 parts by volume of water (a 3% to 6% soln), produces an effective fire-fighting agent which may be sprayed directly on the fire using for example, a 1.5 inch hose at 90 to 120 psi (note: it is contemplated that the injection of air into the mix immediately before application will enhance foam production such that the percentage of ALS in the formulation may be substantially reduced). The formulation has been observed to extinguish the flames on contact without substantial danger of flash-back.

On a volumetric basis, a formulation of the present invention relates to a microbiological fire-fighting formulation of inorganic nutrients, foaming agent and bioremediating component comprising about 45% by volume of inorganic nutrients solution, about 36.7% by volume foaming agent (e.g. ALS) and about 18.3% by volume pre-mixed microbe-surfactant solution (e.g. GC600L 6X), wherein the pre-mixed microbe-surfactant solution comprises a surfactant, a stabilizer, a preservative and a microorganism culture. After mixing the inorganic nutrients solution, the foaming agent and the pre-mixed microbe-surfactant solution in the amounts as disclosed above, the mixture comprises about 9% to about 12% by volume bacteria culture, up to about 0.28% by volume stabilizer, about 3% to about 5% by volume surfactant, and from 30% up to about 36% by volume foaming agent. Of course, trace amounts of the nutrients of the inorganic nutrients solution are also present in the mixture. The inorganic nutrients in the inorganic nutrients solution are substantially effective in causing the microbes to double in population every twenty minutes. In this formulation of the invention the microbe-solution comprises a nonionic surfactant, a stabilizer, a preservative and a microorganism culture. In addition, it should be noted that the composition as described above wherein the percentage of foaming agent is reduced to as low as 10% (the deficit being made up by increasing the volume of bacteria culture) has been tested with satisfactory though less than optimal results.

According to a preferred and currently practiced formulation of the present invention there is provided a microbiological fire-fighting formulation comprising about 18.3% by volume BI-CHEM GC 600L 6X (Sybron Chemicals, Incorporated), about 36.7% by volume ammonium lauryl sulfate (a foaming agent), and about 45% by volume preferred INORGANIC NUTRIENTS solution. Normal strength "BI-CHEM GC 600L" is comprised of 10% by volume BI-CHEM spore concentrate (P); 3.2% by volume nonionic surfactant such as "TRITON X-100" (by Rohn & Haas), "NP-9" or "NP-13" (by Emery); 0.25% opacifier spore stabilizer such as "WITOOPAQUE R-11" (by Emulsion Systems) or sodium hydroxide; and 0.3% perfume such as "86F/471" (by Fragrance Resources, Keyport, N.J.), "407322" (by Fragrascent Neumark Extra, by Ingredient Tech Corp., Des Plaines, Ill.) or Arylene N. Fragrance (by Arlyessence, Inc.), with the balance being water. A preservative may optionally be used. GC 600L 6X as used in the present invention is a concentrate of GC 600L (6 times normal concentration) and is readily available on the market. However, in the formulations of the present invention, a trace amount of alcohol which is normally a constituent in the commercially available product is removed by the manufacturer by request prior to use in the present invention.

The ALS used in the formulation of this invention is comprised of about 30% to 33% ammonium lauryl sulfate solution having a specific gravity of 1.05 at 25 degrees C.

Opacifier present in GC600L 6X is a stabilizer which helps ensure that the microbes remain in a spore while in storage and until applied to the organic compounds to be consumed. When diluted with water or inorganic nutrients solution, the concentration of stabilizer remains sufficient to keep the microbes in spore until a food source is available. When the microbes are excited by the presence of a food source, they then become activated and are able to begin the decomposition of organic wastes.

The perfume used in the currently practiced formulation of the present invention is of course optional. It has been found that the pleasant masking odor of the perfume helps in improving the working environment around a spill for the emergency response personnel.

At the time of application to a fire, the present invention is mixed with water preferably in the ratio comprising one part by volume formulation and between 17 parts and 100 parts by volume water, depending on the type of fire to be extinguished. Additionally, the diluted formulation may be turbulated prior to application to the fire.

The following example is given to aid in the practice of this invention and are for the purposes of illustration only and should not be construed as being limiting on the overall scope of the invention described.

EXAMPLE 1

A representative test comparing the effectiveness of the formulation of the present invention with "AFFF" (3M Company) was conducted at the Brayton Fire Field at Texas A&M University. A 21 foot diameter (346 square feet surface area) steel tank is filled with 65 gallons of diesel and 15 gallons of gasoline. The fuel is ignited and allowed to burn for 30 seconds prior to an attempt to extinguish the flames. The equipment used to apply a 3% solution of "MICRO BLAZE OUT" fire-fighting foam includes a pressure nozzle set mid-range at a 95 gallons per minute (therefore, 3.6 GPM/square foot) dispense rate using a straight stream. Result is an extinguishment time of 30 seconds.

AFFF testing under the same conditions extinguished the flames in a comparable period of time, but at a product cost 20% greater than the MICRO-BLAZE OUT used. In addition, the use of AFFF raises environmental concerns, possibly requiring mechanical removal at considerable additional expense.

Variations of the formulation used in the Example above can be prepared by altering the relative amounts of ingredients and/or by replacing them with functionally similar ingredients. Formulations have been prepared with greater and less amounts of ALS, and inorganic nutrients with acceptable, although not optimal results.

The order of the ingredients added and mixing technique are not particularly important. However, the typical preparation of the formulation proceeds as follows: first, one fifty-five (55) gallon drum of GC 600L 6X is placed in a three hundred (300) gallon mixing container. To this is added one fifty-five (55) gallon drum of the ALS. Then fifty-five (55) gallons of inorganic nutrients solution is added. Another fifty-five (55) gallon drum of ALS solution is added. The balance of the 300 gallon formulation is made up of either water or inorganic nutrients solution. The container is then capped off and mixed. It is then ready to ship. At the site, it may be diluted with water in an amount depending on the application for which it is to be used. The pH of the formulation remains about neutral, and is rarely above 8. It has therefore not been observed to be necessary to control the pH of the formulation. However, if pH control is necessary, pH may be adjusted using NaOH or HCl.

It is contemplated that additives may be used to enhance the bubble stability of the foam. In addition, it is likely that any number of known freezing point depressants may be added to the basic formulation to help prevent freezing of the concentrate. The additives used in the formulation of this invention are those which exhibit minimal adverse environmental and toxic effects. It is anticipated that these environmentally safe components could be replaced by less desirable agents, if necessary, without substantially diminishing the functionality of the invention.

The basic formulation is diluted to a range of from approximately 1% to 6% with water prior to turbulation to produce foam. The preferred dilution is dependent on the type of fire, but a relatively wide range is functional. At 3% (i.e. 97 parts per hundred volume of water) dilution, the solution produces a quality foam which is highly cost effective.

The advantages of the present invention have been clearly presented. The formulation of the invention as described above and in the claims below provides a fire-fighting foam and residual spill control agent which can be stored indefinitely and dispensed as required from conventional fire extinguishing devices. The formulation begins to work immediately, extinguishing the fire and breaking down some of the most volatile organic materials in only a matter of minutes. This enables the stabilization of volatile surfaces in a short period, decreasing the immediate danger of explosion or ignition and thereby protecting lives and property. This ability is enhanced by the presence of surfactants in the formulation which begins the process of inerting the volatiles and disperses the organic compounds such that more surface area is exposed for microbial decomposition.

Thus it is apparent that in accordance with the present invention, an improved foamable concentrate and method of mixing same is provided which fully satisfies the objectives set forth above. While the invention has been described in conjunction with specific embodiments, it is evident that many alternatives, variations, modifications and permutations will become apparent to those skilled in the art in light of the foregoing description. Accordingly, it is intended that the present invention embrace all such alternatives, variations, modifications and permutations as fall within the spirit and broad scope of the appended claims.

What is claimed as new and desired to be secured by Letters Patent is:

1. A fire extinguishing and bioremediating mixture comprising an aqueous solution of:

a fire extinguishing component—including a biodegradable foaming agent—, and a sporogenous bacteria containing bioremediating component.

2. A mixture of claim 1 wherein:

the fire extinguishing component includes a biodegradable surfactant having a concentration of about 3% by volume to about 5% by volume in said mixture, and a biodegradable foaming agent having a concentration of about 30% by volume to about 36% by volume in said mixture.

3. The mixture of claim 1 wherein:

the fire extinguishing component includes ammonium lauryl sulfate as a biodegradable foaming agent.

4. The mixture of claim 1 wherein:

the fire extinguishing component includes a biodegradable nonionic surfactant.

5. The mixture of claim 1 wherein:

the fire extinguishing component includes a surfactant which is an alkylphenol and ethlyene oxide molecular derivative having at least 7 to about 15 ethylene oxide moieties per alkylphenol moiety.

6. The mixture of claim 2 wherein:

the surfactant is selected from the group consisting of:

an ethoxylated alkylphenol, a polysaccharide ether, an ethylene oxide adduct of a fatty acid, an ethylene oxide adduct of an amine, a quaternary ammonium chloride derivative of polypropoxy tertiary amine, octylphenoxypolyethoxyethylphosphate, or sodium dioctylsulfosuccinate.

7. The mixture of claim 1 having a pH range of about 5 to about 9.

8. The mixture of claim 1 having about a neutral pH.

9. A mixture of claim 1 wherein:

the bioremediating component includes a sporogenous microbe.

10. A mixture of claim 1 wherein:

the bioremediating component includes an activatable microbe spore.

11. A mixture of claim 1 wherein:

the bioremediating component includes at least one microbe selected from the group consisting of: *B. subtilis*, *B. Licheniformis* and *B. polymyxa*.

12. A mixture of claim 1 wherein:

the bioremediating component includes a spore concentrate having a concentration of about 9% by volume to about 12% by volume in said mixture.

13. A mixture of claim 1 wherein:

the bioremediating component includes inorganic nutrients.

14. A mixture of claim 1 wherein:

the bioremediating component includes trace concentrations of inorganic nutrients selected from the group consisting of nitrogen, phosphorous, potassium and iron.

15. A mixture of claim 1 wherein:

the bioremediating component includes a stabilizer.

16. A mixture of claim 15 wherein:

the stabilizer is sodium hydroxide.

17. A mixture of claim 1 wherein:

the bioremediating component includes a stabilizer, which stabilizer is sodium hydroxide having a concentration of about 0.28% by volume in said mixture.

18. A mixture of claim 1 wherein:

the bioremediating component includes a preservative.

19. A mixture of claim 1 wherein:

the bioremediating component includes as a preservative comprising benzisothiazolin and dipropylene glycol.

20. A mixture of claim 1 including a perfume agent having a concentration of about 0.33% by volume.

21. A method of using the mixture of claim 1 to extinguish a fire and to bioremediate a fire site comprising the steps of:

combining said mixture with water to form a dilution having a ratio of about 1 part of said mixture to about 10 to 100 parts of water;

turbulating the dilution;

applying a sufficient amount of the aerated dilution over the surface of said fire site to extinguish and to prevent re-ignition of said fire; and leaving said mixture in place on said fire site to bioremediate said fire site.

22. A mixture useful for extinguishing fires and bioremediating a fire site comprising:

about 55 parts pre-mixed sporagenous bacteria surfactant solution; 110 parts of 30% to 33% ammonium lauryl sulfate solution; and 135 parts selected from the group consisting of water and inorganic nutrient solution.

* * * * *